United States Patent [19]

Witt

[11] 4,339,105
[45] Jul. 13, 1982

[54] CLAMP FOR SECURING LARGE CAN-TYPE CAPACITORS TO A CIRCUIT CHASSIS

[75] Inventor: Eugene F. Witt, Lake Hopatcong, N.J.

[73] Assignee: Bell Telephone Laboratories, Incorporated, Murray Hill, N.J.

[21] Appl. No.: 159,943

[22] Filed: Jun. 16, 1980

[51] Int. Cl.³ .............................................. A47B 97/00
[52] U.S. Cl. .............................. 248/500; 24/248 SA; 180/68.5
[58] Field of Search ............... 248/154, 500, 507, 508, 248/510, 149, 503; 137/151; 24/259 R, 248 SA, 263 A; 180/68.5

[56] References Cited

U.S. PATENT DOCUMENTS

| | | | |
|---|---|---|---|
| 2,112,155 | 3/1938 | Haney et al. | 248/154 |
| 2,489,392 | 11/1949 | Wood | 248/500 |
| 2,760,674 | 8/1956 | Karp | 24/259 R |
| 2,869,580 | 1/1959 | Almond | 137/571 |
| 2,959,387 | 11/1960 | Ficek | 248/149 |
| 4,084,701 | 4/1978 | White | 248/154 X |

Primary Examiner—William H. Schultz
Assistant Examiner—Ramon O. Ramirez
Attorney, Agent, or Firm—A. G. Steinmetz

[57] ABSTRACT

A clamping arrangement for securing a can-type capacitor (40) to a chassis surface (33) comprises two tie rods (31, 32) each having a clamping arrangement at one end (12, 17) and locking means (16) to engage with a slot (20) in the chassis surface at the other end. The tie rod is engaged with the slots in the chassis surface and the clamp engages the can capacitor. A fastener (17) operates through a fulcrum hinge (13) of the clamp to apply pressure to the can to firmly secure the can capacitor to the chassis surface.

5 Claims, 4 Drawing Figures

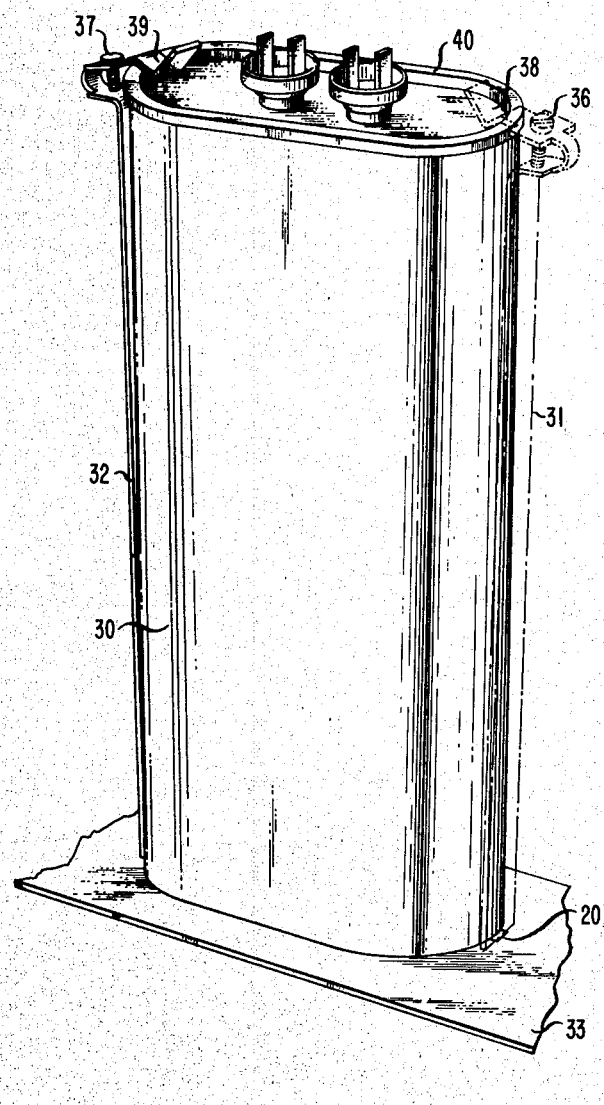
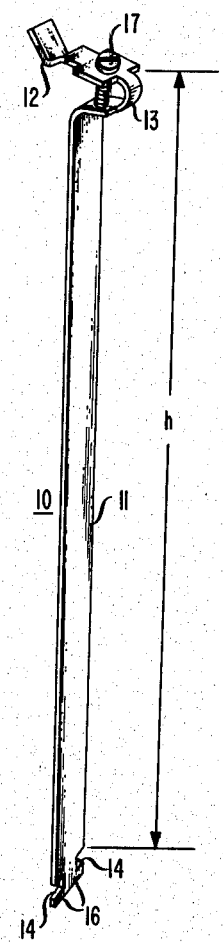

CLAMP FOR SECURING LARGE CAN-TYPE CAPACITORS TO A CIRCUIT CHASSIS

BACKGROUND OF THE INVENTION

1. Field of the Invention

This invention is concerned with a clamp to secure electrical components to a circuit chassis. It is specifically concerned with a clamp to secure large can-type capacitor structures to a circuit chassis.

2. Description of the Prior Art

Can-type capacitors are secured to a circuit chassis at present by either securing them on their side with a strap to the chassis or by clamping them upright with clamps that parallel the longitudinal axis of the can. A typical prior art parallel clamp has a fixed hook, which slips over one end of the capacitor can. The clamp is screwed at the other end of the capacitor to the base chassis structure. The longitudinal dimension of this clamp must match the longitudinal dimension of the can capacitor. This clamping arrangement requires a fairly high level of assembly worker dexterity and is time consuming, inasmuch as the clamp and the can capacitor must be held in place while a screw is positioned at the base to hold the clamp against the chassis. The clamp is then clipped over the top edge of the can capacitor and the screw at the base is tightened thereby securing the can capacitor to the chassis. This clamping procedure is particularly difficult to accomplish if the chassis structure to which the can capacitor is affixed comprises a vertical surface. The longitudinal length of the capacitor can further prevents easy access to the screw at the base utilized to securely fasten the clamp and capacitor to the chassis structure.

SUMMARY OF THE INVENTION

Therefore in accordance with the principles of the invention, a clamp operative to secure can-type capacitors to a chassis surface comprises a tie rod, which has tines at one end that engage a precut slot in the chassis surface. At the opposite end of the tie rod is a hinged or compliant hinged clamp with a screw fastener which engages the top of the can. Tightening of the screw fastener applies a clamping force to the top of the can which securely fastens the can capacitor to the chassis surface.

BRIEF DESCRIPTION OF THE DRAWINGS

FIG. 1 is an axonometric projection of a capacitor clamp embodying the principles of the invention;

FIG. 3 is an axonometric projection showing capacitor clamps in use securing a can capacitor to a base chassis structure.

DETAILED DESCRIPTION

Figure 2:
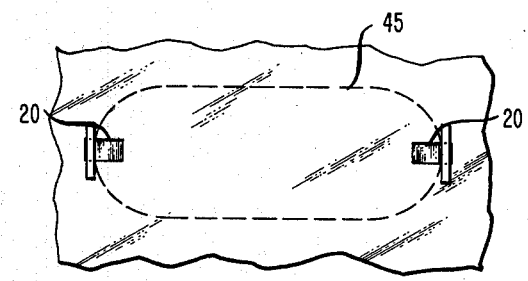
FIG. 2 is a portion of a chassis surface showing precut slots which the clamp engages.

The capacitor clamp, shown in FIG. 1, comprises a tie rod 11, whose linear dimension h from its tine slot 14 to a clamp nodule 12 is substantially equal to the linear dimension or longitudinal length of a can capacitor, which the clamp is designed to secure to a circuit chassis. Tie rod 11 may be made of sheet metal or other suitable material and includes two tines 16 in a T-shape arrangement at the lower end. These tines 16 are operative to engage a precut slot 20 (FIG. 2) in a circuit chassis.

Two clamps 31 and 32 are normally used to secure a single can to a chassis as shown in FIG. 3. Clamps 31 and 32 engage separate slots 20, on opposite sides of the can capacitor, which are cut into a chassis structure as shown in FIG. 2. The overall width of the two tines 16 of the tie rod exceeds the width of slots 20 and hence, can be rotated to lock into the slot and secure the clamp to the chassis structure.

The two slots 20 are suitably cut into the base plate as shown in FIG. 2, so that the perimeter of the cross-section of the can capacitor shown by dotted line 45 covers most of the cut slot area. This ensures that after tines 16 of the tie rod are engaged with slots 20, the positioning of the can capacitor forces these tines to the outer ends of these slots, not covered by the can cross-section. Dotted lines 36 show the tine locations when the can capacitor is clamped in place. This advantageously permits the peripheral boundary surface of the can and the squared end of slot 20 to align the two tie rods so that nodule 12 is positioned to engage an upper edge or lip of the can capacitor, and also assure that the can capacitor is positively positioned into a predetermined location and further assure that the tines 16 are positively locked into slots 20, since the tie rod is prevented from rotating by the side boundary surfaces of the can capacitor and the squared end of slot 20.

At the top end of the clamp is a compliant hinge 13, which is formed by bending a U-shape into a cutaway portion of tie rod 11. Nodule 12, bent into an end of the tie rod, is latched over an edge or top lip of the can. Pressure is applied by screw 17, which in turn, secures the capacitor can to the chassis. Screw or fastening means 17 causes the hinged clamp to pivot about compliant hinge 13 and hence, applies clamping force to the can. As shown, compliant hinge section 13 is cut narrower than the screw fastener portion section. This cutaway design readily permits bending of the structure at this point.

Preferably, nodule 12 may be preadjusted by screw 17, so that it snaps over the lip of the capacitor can to provide initial support to hold the can in place prior to a final tightening of screw 17 to finally secure the can capacitor 30 firmly into place.

A specific application of the capacitor clamp is shown in the axonometric projection view of FIG. 3, which shows clamps 31 and 32 securing can capacitor 30 to chassis surface 33. Two slots 20 are precut in surface 33 of the chassis structure in order to engage the tines of the clamps. While the outer ends of slots 20, as shown, have a square or rectangular profile, other shapes may be used if desired. It is required that slot 20 be narrower than the overall width of tines 16 and that most of its longitudinal dimension which is longer than the overall width of the tines 16 be under the cross section profile of the can. Clamps 31 and 32 are then inserted into the slots by rotating them so that the tines go through the longitudinal distance of slots 20 and then, are again rotated 90 degrees so that the tines of the clamp are locked into the chassis structure. Screws 36 and 37, of clamps 31 and 32, are backed off or preadjusted so that nodules 38 and 39 will easily latch over lip 40 of can capacitor 30. Can capacitor 30 is the placed against chassis surface 33 and nodules 38 and 39 are latched over lip 40. Fastening screws 36 and 37 are then turned so that tightening pressure is applied to the top of can capacitor 30 by nodules 38 and 39, securely fastening it to the chassis structure.

Figure 4:
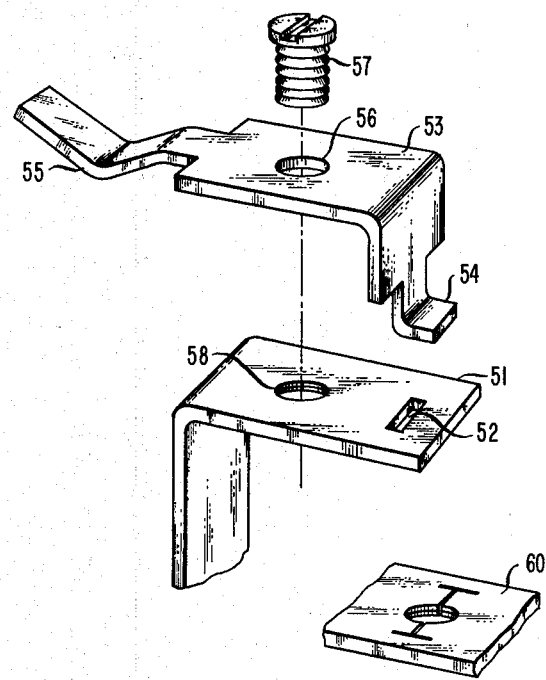
FIG. 4 is an axonometric projection of a part of an alternate embodiment of a capacitor clamp embodying the principles of the invention.

An alternate hinge arrangement for the clamp is disclosed in FIG. 4. As disclosed therein, the upper portion of the tie rod is bent outward at a right angle to form a shelf-like extension 51, into which a slot 52 and a threaded hole 58 is cut. A detachable member 53 includes a hook projection having an L-shape, which engages with slot 52. A screw 57 fits through a hole 56 of the detachable member to engage hole 58 to apply tightening pressure after nodule 55 engages the top edge of the lip of a can capacitor. The threads in hole 58 may be taped or may be stamped by splitting the hole periphery as shown by 60, so that the spring return pressure forms a simulated thread-like condition.

It is readily apparent, to those skilled in the art, that the clamping features of the subject clamp advantageously permit ease of installation and ready application of the clamping force to the can without the necessity of dexterous and complicated manual operations on the part of the installers. Many variations of the invention will suggest themselves to those skilled in the art without departing from the spirit and scope of the present invention.

I claim:

1. A clamping arrangement to secure a can-type electrical component to a base plate surface comprising, first and second tie rods, each having a cross-section with a width substantially greater than its thickness and further including T-shaped tine means at one end and clamping means at an end opposite the one end, the clamping means comprising a nodule to engage an edge or lip of the electrical component, a hinge means about which the nodule is fulcrumed and fastening means to apply clamping force about the hinge means the clamping means including a first member connected to the tie rod and to the hinge means, a second member connected to the hinge and including the nodule and the fastening means including a threaded hole in the first member, a hole in the second member and a screw to join the second member to the first member by passing through the hole and engaging the threaded hole and applying pressure to secure the nodule in the second member to an edge of the can-type electrical component, and first and second slots precut into the base plate surface, each slot having a width less than a width of the tine means, and a longitudinal dimension greater than a width of the tine means, the longitudinal dimension being positioned so that it is located almost substantially entirely under the body of the can-type electrical component after it is positioned on the base plate surface leaving only sufficient longitudinal dimension outside the electrical component to accommodate the thickness of the clamping means engaged with the slot.

2. A clamping arrangement as defined in claim 1 wherein said hinge means comprises, a u-bend joining the first and second members and connected to the tie rod at an end opposite the tine means.

3. A clamping arrangement to secure a can-type electrical component to a base plate surface comprising, first and second tie rods, each having a cross-section with a width substantially greater than its thickness and further including T-shaped tine means at one end and clamping means at an end opposite the one end, the clamping means comprising a nodule to engage an edge or lip of the electrical component, a hinge means about which the nodule is fulcrumed and fastening means to apply clamping force about the hinge means, said hinge means comprising an L-shaped shelf-like extension of said tie rod including a fulcrum slot cut therein, a detachable member including a hook projection to engage the fulcrum slot and fastening means including a threaded hole in the shelf-like extension, a hole in the detachable member and a screw to join the detachable member to the shelf-like extension by passing through the hole and engaging the threaded hole and applying pressure to secure a nodule in the detachable member to an edge of the can-type electrical component, and first and second slots precut into the base plate surface, each slot having a width less than a width of the tine means, and a longitudinal dimension greater than a width of the tine means, the longitudinal dimension being positioned so that it is located almost substantially entirely under the body of the can-type electrical component after it is positioned on the base plate surface leaving only sufficient longitudinal dimension outside the electrical component to accommodate the thickness of the clamping means engaged with the slot.

4. Clamping apparatus for securing a can-type electrical component (30) to a chassis comprising, a tie rod (11) including tine means (16) at one end for engaging a precut slot (20) in the chassis, and clamping means (12,13,17) at an end opposite the one end for securing the can-type electrical component to the chassis including hinged means (13) to couple a clamping force to the can-type electrical component relative to the chassis through the tie rod, said hinged means comprising an L-shaped shelf-like extension (57) of said tie rod including a slot (52) cut therein, a detachable member (53) including a hook projection (54) to engage the slot and fastening means including a threaded hole (58) in the shelf-like extension, a hole (56) in the detachable member and a screw (57) to join the detachable member to the shelf-like extension by passing through the hole and engaging the threaded hole and applying pressure to secure a nodule (55) in the detachable member to an edge of the can-type electrical component.

5. A clamp as defined in claim 4 wherein a width of the slot is less than a width of the tine means and the longitudinal dimension of the slot is positioned so that it is located almost substantially under the can-type component after it is positioned on the chassis leaving only sufficient dimension to accommodate the thickness of the sheet metal members and ends of the slots having a substantially rectangular profile.

* * * * *